US 9,789,972 B2

(12) United States Patent
Smith et al.

(10) Patent No.: US 9,789,972 B2
(45) Date of Patent: Oct. 17, 2017

(54) FUEL AND THERMAL MANAGEMENT SYSTEM

(71) Applicant: Hamilton Sundstrand Corporation, Charlotte, NC (US)

(72) Inventors: Peter G. Smith, Middletown, CT (US); Craig R. Bolt, Glastonbury, CT (US); Jonathan K. Niemeyer, Tolland, CT (US); Thomas G. Tillman, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 223 days.

(21) Appl. No.: 14/317,748

(22) Filed: Jun. 27, 2014

(65) Prior Publication Data

US 2015/0375868 A1 Dec. 31, 2015

(51) Int. Cl.
*B64D 37/34* (2006.01)
*F01P 11/08* (2006.01)
*F02C 7/224* (2006.01)
*F02M 31/10* (2006.01)
*F02M 31/16* (2006.01)
(Continued)

(52) U.S. Cl.
CPC ............ *B64D 37/34* (2013.01); *F01P 11/08* (2013.01); *F02C 7/18* (2013.01); *F02C 7/224* (2013.01); *F02D 33/003* (2013.01); *F02M 31/10* (2013.01); *F02M 31/125* (2013.01); *F02M 31/16* (2013.01); *G05D 7/0641* (2013.01); *G05D 23/19* (2013.01); *F01M 2005/004* (2013.01); *F01P 2003/006* (2013.01); *F01P 2060/10* (2013.01); *F02D 2200/0606* (2013.01); *F02D 2200/0611* (2013.01); *F02M 31/20* (2013.01);
(Continued)

(58) Field of Classification Search
CPC ... B64D 37/34; F02C 7/18; F02C 7/16; F02C 7/224; F02C 7/14; G05D 23/19; G05D 7/0641; F01P 11/08; F01P 2060/10; F02D 2200/0606; F02D 33/003; F02M 31/20; F02M 31/125; F02M 31/10; F02M 31/16
See application file for complete search history.

(56) References Cited

U.S. PATENT DOCUMENTS 4,773,212 A * 9/1988 Griffin .................... F02C 7/224
60/226.1
6,315,815 B1 * 11/2001 Spadaccini ........ B01D 19/0031
95/46
(Continued)

FOREIGN PATENT DOCUMENTS

EP 1557357 A2 7/2005
EP 1857638 A2 11/2007
(Continued)

*Primary Examiner* — Joseph Dallo
(74) *Attorney, Agent, or Firm* — Cantor Colburn LLP

(57) ABSTRACT

A system for fuel and thermal management of fuel delivered to an engine is disclosed. The system includes a supply of fuel in fluid communication with a fuel inlet of the engine, and an oxygen sensor for measuring dissolved oxygen content in the fuel is in fluid communication with the fuel. The fuel is heated by transferring heat from engine oil in a heat exchanger. The temperature of the fuel is controlled by controlling engine oil flow and airflow through another heat exchanger upstream of the fuel/oil heat exchanger on the oil circulation path with engine oil.

15 Claims, 4 Drawing Sheets

(51) Int. Cl.
*G05D 7/06* (2006.01)
*G05D 23/19* (2006.01)
*F02D 33/00* (2006.01)
*F02M 31/125* (2006.01)
*F02C 7/18* (2006.01)
*F02M 31/20* (2006.01)
*F01M 5/00* (2006.01)
*F01P 3/00* (2006.01)

(52) U.S. Cl.
CPC ............ *Y02T 10/126* (2013.01); *Y02T 50/671* (2013.01); *Y02T 50/675* (2013.01)

(56) References Cited

U.S. PATENT DOCUMENTS

| | | | | |
|---|---|---|---|---|
| 6,707,492 | B1 * | 3/2004 | Itani | H03M 1/187 341/139 |
| 6,939,392 | B2 * | 9/2005 | Huang | B01D 19/0031 55/385.1 |
| 7,041,154 | B2 * | 5/2006 | Staroselsky | B01D 19/0031 95/30 |
| 7,153,343 | B2 * | 12/2006 | Burlatsky | B01D 19/0031 95/265 |
| 7,175,693 | B2 * | 2/2007 | Spadaccini | B01D 19/0031 95/46 |
| 7,231,769 | B2 * | 6/2007 | Spadaccini | B01D 19/0031 60/736 |
| 7,260,926 | B2 | 8/2007 | Sabatino | |
| 7,329,305 | B2 * | 2/2008 | Sloan | B01D 19/0031 95/46 |
| 7,377,112 | B2 * | 5/2008 | Spadaccini | B01B 1/005 431/356 |
| 7,393,388 | B2 * | 7/2008 | Spadaccini | B01D 19/0031 210/497.1 |
| 7,431,818 | B2 * | 10/2008 | Cipollini | C10G 32/02 204/252 |
| 7,435,283 | B2 * | 10/2008 | Tillman | B01D 19/0031 95/46 |
| 7,465,335 | B2 * | 12/2008 | Schmidt | B01D 19/0031 95/46 |
| 7,465,336 | B2 * | 12/2008 | McHugh | B01D 19/0031 55/524 |
| 7,537,646 | B2 * | 5/2009 | Chen | B01B 1/005 123/552 |
| 7,569,099 | B2 * | 8/2009 | Coffin | B01D 19/0031 210/640 |
| 7,582,137 | B2 * | 9/2009 | Chen | B01D 19/0031 210/640 |
| 7,601,203 | B2 * | 10/2009 | Reeve | B01D 19/0036 210/640 |
| 7,615,104 | B2 * | 11/2009 | Cordatos | B01D 19/0031 210/490 |
| 7,632,338 | B2 * | 12/2009 | Cipollini | B01D 19/0084 204/157.5 |
| 7,718,302 | B2 * | 5/2010 | Cipollini | B01D 19/0005 204/252 |
| 7,744,827 | B2 * | 6/2010 | Vanderspurt | C10G 27/10 208/112 |
| 7,882,704 | B2 * | 2/2011 | Chen | F02C 3/24 122/23 |
| 8,534,044 | B2 | 9/2013 | Smith | |
| 2002/0121082 | A1 * | 9/2002 | Hashimoto | F01D 9/02 60/266 |
| 2004/0172947 | A1 * | 9/2004 | Takahama | F02C 6/18 60/772 |
| 2005/0155353 | A1 * | 7/2005 | Sabatino | B64D 37/34 60/772 |
| 2005/0268619 | A1 * | 12/2005 | Ress | F01D 5/082 60/782 |
| 2007/0101731 | A1 * | 5/2007 | Bayt | B64D 13/06 62/7 |
| 2007/0264133 | A1 * | 11/2007 | Schwarz | F01D 25/125 417/110 |
| 2008/0310955 | A1 * | 12/2008 | Norris | F02C 7/14 415/178 |
| 2009/0056342 | A1 * | 3/2009 | Kirzhner | F01D 25/12 60/772 |
| 2009/0260775 | A1 * | 10/2009 | Maucher | F01N 5/02 165/41 |
| 2011/0247315 | A1 * | 10/2011 | Rhoden | F02C 9/40 60/39.281 |
| 2013/0186100 | A1 * | 7/2013 | Rhoden | B64D 13/006 60/782 |
| 2015/0375868 | A1 | 12/2015 | Smith | |

FOREIGN PATENT DOCUMENTS

EP 2617649 A2 7/2013
EP 2713027 A2 4/2014

* cited by examiner

FUEL AND THERMAL MANAGEMENT SYSTEM

BACKGROUND OF THE INVENTION

Military and commercial aircraft utilize numerous engineered systems to control the temperature of heat sensitive components within the aircraft. These systems are designed to transfer heat from components or structures to air, fuel, or water based cooling media through heat exchangers. Operation of these systems degrades airplane performance through a combination of additional aerodynamic drag, parasitic losses, or increased weight. The use of aircraft fuel as a cooling media is the most efficient option as the rejected heat increases the enthalpy of the fuel which in turn has the potential to provide additional energy that can be thermodynamically recovered in the engine cycle.

However, the use of aircraft fuel as a heat sink has not found widespread acceptance in commercial aircraft systems due to a variety of factors. A significant challenge to implementation of fuel-based thermal management systems on aircraft has been and continues to be the formation varnish or coke deposits on high temperature surfaces with which the fuel comes in contact. These deposits can cause problems, such as preventing proper operation of components, clogging passages, or increasing friction between moving parts. One of the factors thought to contribute to coke deposits on high-temperature surfaces is dissolved oxygen content in the fuel. Various systems have been proposed for treating fuel to remove or reduce dissolved oxygen, but these systems also suffer from a number of challenges that have impeded their implementation, including but not limited to cost, energy consumption, payload weight, maintenance issues, and the need to regenerate and/or replenish consumable materials that some of these systems use. Accordingly, there remains a need in the art for alternative systems and techniques for onboard thermal management of aircraft fuel.

BRIEF DESCRIPTION OF THE INVENTION

According the invention, a system for fuel and thermal management of fuel delivered to an engine comprises a supply of fuel in fluid communication with a fuel inlet of the engine. An oxygen sensor for measuring dissolved oxygen content in the fuel is in fluid communication with the fuel. A first heat exchanger comprises a first section in fluid communication with engine oil and a second section in thermal communication with the first section and in fluid communication with ambient air. A second heat exchanger comprises a third section in fluid communication with the fuel and a fourth section in thermal communication with the third section and in fluid communication the engine oil, wherein the fourth section is in fluid communication with and downstream of the first heat exchanger section. An engine oil bypass conduit around the first heat exchanger is in fluid communication with the engine oil upstream of the first heat exchanger and with the engine oil downstream of the first heat exchanger and upstream of the second heat exchanger. The engine oil bypass also includes an oil bypass valve in fluid communication with the engine oil upstream of the first heat exchanger, the oil bypass valve configured to selectively distribute a flow of engine oil between the first heat exchanger section and the engine oil bypass conduit. A control valve is provided in fluid communication with the second heat exchanger section configured to control a flow of ambient air through the second heat exchanger section.

The system also includes an electronic controller configured to set a position of the oil bypass valve and/or a position of the control valve during operation of the system in response to: (i) dissolved oxygen content of the fuel and (ii) temperature of the engine oil and/or the fuel at the second heat exchanger.

In some aspects of the invention, a method of thermally managing and delivering fuel to an engine, comprises measuring the concentration of dissolved oxygen in the fuel, heating the fuel in a second heat exchanger with heat from oil circulated from the engine, and controllably directing, based on (i) dissolved oxygen content of the fuel and (ii) temperature of the engine oil and/or the fuel at the second heat exchanger, a quantity of the circulated oil through a first heat exchanger to cool circulated oil. In some aspects, the method further comprises controlling a quantity of the circulated oil through a bypass around the first heat exchanger and/or controlling a quantity of cooling air delivered to the first heat exchanger. In some aspects, the method further comprises heating the fuel in a third heat exchanger with oil circulated from a generator. In some aspects, the method further comprises directing fuel through a fuel stabilization unit in fluid communication with the fuel upstream of the heat exchangers for removing dissolved oxygen from the fuel, and selectively distributing a flow of fuel between a first fuel flow path leading to the second heat exchanger without passing through the fuel stabilization unit and a second fuel flow path leading to the second heat exchanger through the fuel stabilization unit.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying figures, in which:

DETAILED DESCRIPTION OF THE INVENTION

Figure 1:
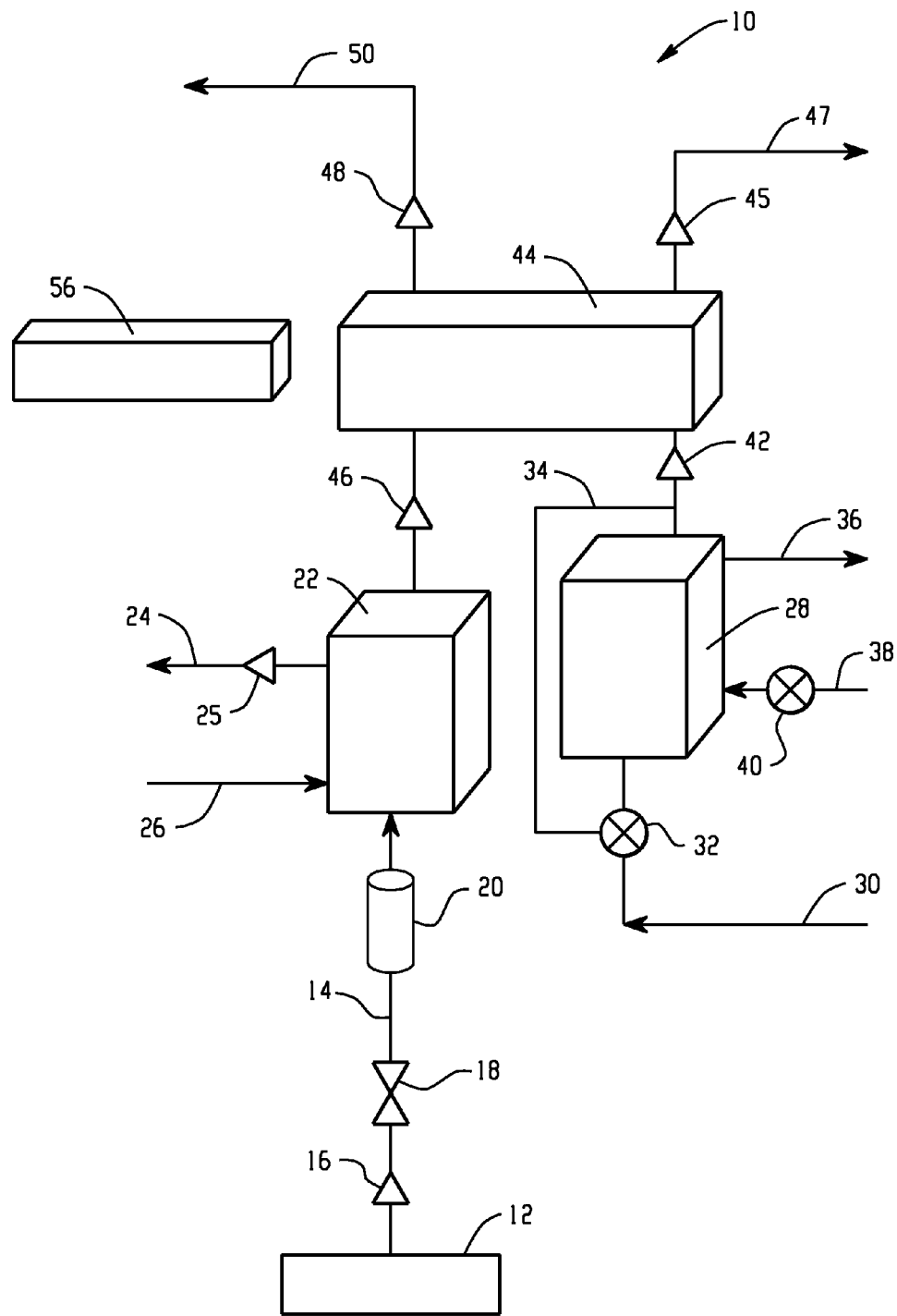
FIG. 1 is a schematic depiction of an exemplary system as further described herein.
Figure 2:
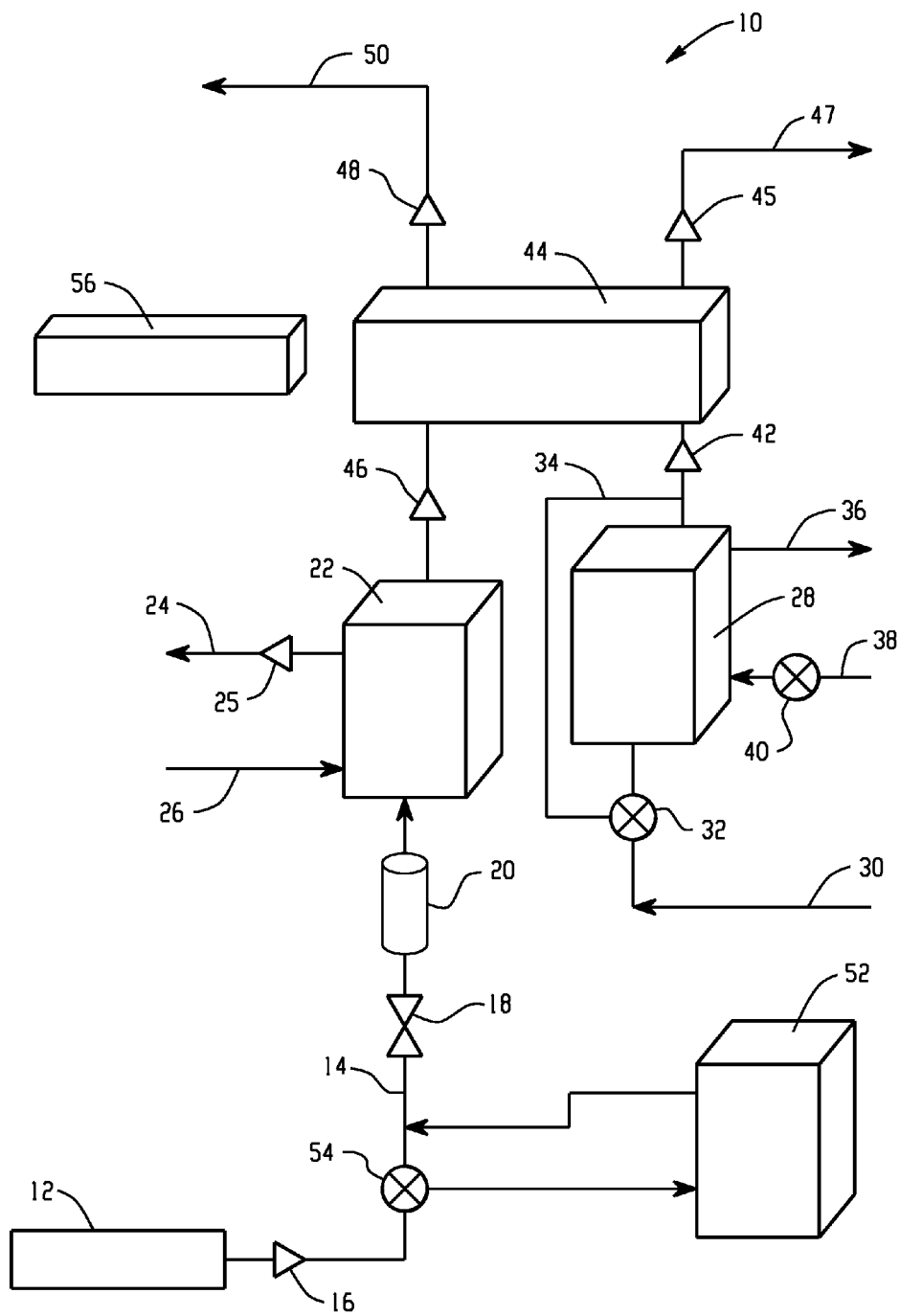
FIG. 2 is a schematic depiction of another exemplary system as further described herein.

With reference to the Figures, FIGS. 1 and 2 schematically depict exemplary systems of the invention. As shown in FIGS. 1 and 2, exemplary fuel and thermal management systems 10 are shown with fuel tank 12 providing fuel through fuel line 14 having temperature sensor 16 and oxygen sensor 18 for measuring dissolved oxygen levels in the fuel. A flow meter 20 measures fuel flow rate of fuel entering the system 10. Fuel is delivered to optional heat exchanger 22, which transfers heat to the fuel from lubricating oil circulated to an electrical generator (not shown) through oil lines 24, 26 having oil temperature sensor 25, thus raising the temperature of the fuel. Optional heat exchanger 22 has separate sections in thermal communication with one another, with one of the sections accommodating oil circulating to the generator and another section accommodating fuel.

Lubricating oil from an engine (not shown) is circulated to a first heat exchanger 28 through oil inlet line 30 having a bypass valve 32. Bypass valve 32 is configured to controllably distribute oil between a flow path through heat exchanger 28 and a flow path through oil bypass line 34. First heat exchanger 28 transfers heat from the engine oil flowing through a first section (not shown) of the heat exchanger to ambient air flowing through or across a second section (not shown) of the heat exchanger. Air is depicted circulating through air lines 36, 38 having a control valve 40 for controlling the amount of air flow. Oil temperature is measured downstream of the first heat exchanger 28 and oil bypass 34 with temperature sensor 42. Engine oil flows from the first heat exchanger 28 and oil bypass 34 to second heat exchanger 44, where it flows through a third heat exchanger section (not shown) and transfers heat to fuel flowing through a fourth heat exchanger section (not shown). Temperature of engine oil at the second heat exchanger 44 is measured by temperature sensors 42, 45, upstream and downstream, respectively, of the second heat exchanger 44. After the oil passes temperature sensor 45, it flows out of the system through oil outlet line 47 from where it is returned to the engine. As used herein, with respect to the engine oil, downstream means in the direction of oil flow within the fuel and thermal management system (illustrated in FIGS. 1 and 2 as flow in the direction between inlet line 30 and oil outlet line 47 in FIGS. 1 and 2), and upstream means in the opposite direction of downstream. Fuel is introduced to the second heat exchanger 44 from the heat exchanger 22 (if present) or directly from the fuel tank 12. Temperature of fuel at the second heat exchanger 44 is measured by temperature sensors 46, 48, upstream and downstream, respectively, of the second heat exchanger 44. Fuel exiting the second heat exchanger 44 is delivered through fuel line 50 to an engine fuel inlet (not shown). As used herein, with respect to the fuel, downstream means in the direction of fuel within the fuel and thermal management system (illustrated in FIGS. 1 and 2 as the direction of flow between fuel tank 12 and fuel line 50), and upstream means in the opposite direction of downstream.

With reference to FIG. 2, an optional fuel stabilization unit (FSU) 52 is shown in fluid communication with fuel line 14. Bypass valve 54 controllably distributes fuel between a flow path leading downstream to the heat exchanger 22 and a flow path circulating to FSU 52. The FSU 52 is used to reduce dissolved oxygen content in the fuel. FSU's are well-known in the art, and do not require detailed explanation herein. FSU's typically utilize membranes and/or chemical or electrochemical materials, components, and techniques to deoxygenate fuel. Exemplary FSU's are described, for example, in U.S. Pat. Nos. 8,177,884, 7,615,104, and 7,431,818, the disclosures of which are incorporated herein by reference in their entirety.

Figure 3:
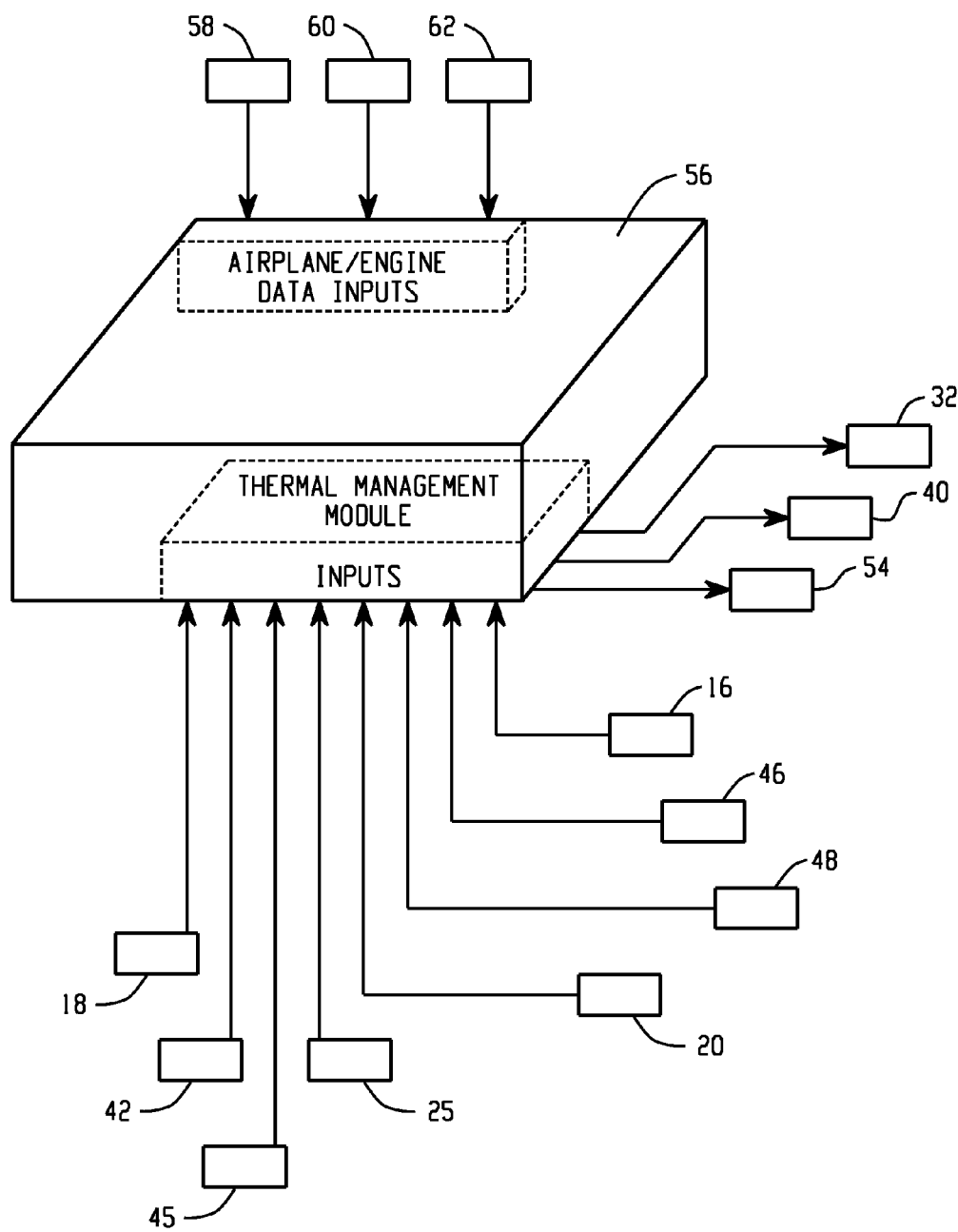
FIG. 3 is a schematic depiction of an electronic controller as further described herein.

Referring again to FIGS. 1 and 2, an electronic controller (i.e., electronic control unit or ECU) 56 is shown. ECU 56 is connected to the various sensors and controllable components shown in FIGS. 1 and 2, as well as to other aircraft components and systems not shown in FIGS. 1 and 2. For ease of illustration, these connections are shown in a separate figure, FIG. 3. As shown in FIG. 3, ECU 56 receives aircraft data inputs from systems or sensors providing data on measurements such as altitude 58, thrust 60, and outside air temperature 62. These measurements can be used by the ECU 56 to determine an optimal or target temperature for the fuel being delivered to the engine in order to enhance engine performance at the conditions under which it is operating. In some embodiments, fuel system 10 is engaged to provide increased fuel temperature at typical cruising altitudes. ECU 56 also receives inputs from oxygen sensor 18, fuel temperature sensors 16, 46, and 48, oil temperature sensors 25, 42, and 45, and fuel flow meter 20. ECU 56 provides output signals to bypass valve 32, control valve 40, and bypass valve 54.

Figure 4:
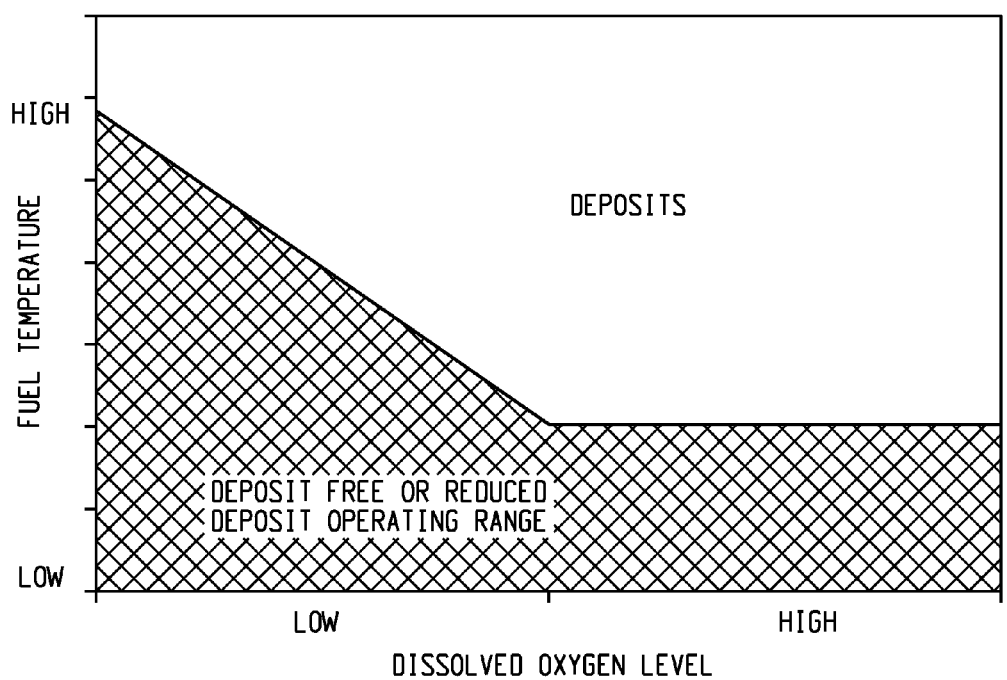
FIG. 4 is a schematic depiction of fuel deposit formation as a function of fuel temperature and dissolved oxygen level in the fuel.

In exemplary embodiments of the operation of system 10, ECU 56 controls the bypass valve 32 and control valve 40, to achieve a target fuel temperature delivered to the engine, with the proviso that fuel temperature at the second heat exchanger 44 is maintained below a variably set level based on dissolved oxygen content in the fuel reported by the output of oxygen sensor 18. In exemplary embodiments, the ECU 56 accomplishes this by comparing the dissolved oxygen content reported by oxygen sensor 18 with information electronically stored in ECU 56 on the formation of fuel deposits (i.e., the susceptibility or tendency of the fuel to form deposits) as a function of fuel temperature. An example of such information is graphically represented by FIG. 4, which depicts two domains as a function of fuel temperature and dissolved oxygen level in the fuel. One of the domains is designated as a deposit-free or reduced deposit domain where deposit formation does not occur or occurs at an acceptable level for continued system health and operation. The other domain is designated as a 'Deposits' domain, where deposits occur at an unacceptable level for continued system health and operation. As can be observed from FIG. 4, higher temperatures and/or higher levels of dissolved oxygen favor deposit formation whereas lower temperatures and/or lower levels of dissolved oxygen favor away from deposit formation. The information represented by FIG. 4 can be stored in the ECU 56 in the form of a lookup table, such as a table of maximum allowable temperature at which fuel deposits are at an acceptable level for a specified fuel oxygen level. The information represented by FIG. 4 can also be stored in the ECU 56 in the form of a mathematical function that plots the dividing line between the two domains shown in FIG. 4 as a function of temperature and oxygen content.

In operation, the ECU 56 attempts to achieve the target delivered fuel temperature by controlling amounts of engine oil and ambient airflow through the first heat exchanger 28. The amount of oil flowing through the first heat exchanger 28 is controlled by setting the oil bypass valve 32 to direct greater or lesser amounts of oil through the heat exchanger 28 versus through the oil bypass conduit 34. The amount of airflow is controlled by setting the control valve 40. Greater amounts of oil and/or air flowing through the first heat exchanger 28 tend to reduce the temperature of the oil whereas lower amounts of oil and/or air flowing through the first heat exchanger 28 tend to increase the temperature of the oil. Higher oil temperatures cause higher fuel temperatures at the second heat exchanger 44. The ECU 56 described above may provide for an engine oil temperature to be achieved that provides an amount of heat transfer in the second heat exchanger 44 to achieve a target or desired fuel temperature delivered to the engine. The ECU 56 may also provide a maximum fuel temperature delivered to the engine that can be achieved without incurring an unacceptable level of fuel coke or varnish deposits In most cases, there is more than sufficient heat contained in the engine oil (plus heat in generator oil transferred to the fuel in optional heat exchanger 22) to achieve a target delivered fuel temperature, and the temperature of the engine oil is controlled by the setting the airflow and bypass ratio (i.e., amount of oil flowing through bypass conduit 34 versus through the heat exchanger 28) so as not to exceed the target temperature. However, as noted above, the valve settings are controlled so that the fuel temperature does not exceed level based on dissolved oxygen content in the fuel. In many cases, the target temperature is at or below the maximum temperature allowed for avoiding deposits at the measured oxygen concentration. In some embodiments, however, the target fuel temperature is above such a maximum allowable temperature. For such embodiments, the ECU 56 can be configured to determine or predict whether dissolved oxygen content can or will be reduced by expected changes brought about by altitude changes and/or the operation of inert gassing systems where inert gas such as nitrogen is bubbled through fuel in the fuel into the fuel tank's gas space (i.e., ullage). In some embodiments, the ECU 56 can control the inert gassing level in order to reduce the dissolved oxygen content in the fuel. In some embodiments such as shown in FIG. 2 where an on-board FSU 52 is present, ECU 56 controls an amount of fuel diverted into FSU 52 by setting bypass valve 54. In such a case, the load on the FSU 52 can thus be controlled to the minimum level needed in order to enable the system 10 to achieve the target fuel temperature, so that overall load on the FSU 52 as well as its design capacity requirements can be reduced compared to a system without the integrated control provided by the invention.

In some aspects of the invention, the electronic controller is configured to set a position of the oil bypass valve and/or a position of the control valve during operation of the system further in response to: (iii) stored information on the formation of fuel deposits as a function of fuel temperature and dissolved oxygen content of the fuel. It should be noted that, as used herein throughout this document, "and/or" as used to link multiple components means that the components can be present individually in the alternative or combined in any available combination or subcombination. For example, the phrase "A and/or B" means "A, or B, or both A and B".

In some aspects of the invention, the electronic controller is configured to set the oil bypass valve to increase engine oil flow through the first heat exchanger, and/or to set the control valve to increase air flow through the first heat exchanger, the oil bypass and/or control valves set in response to a determination that engine oil temperature or fuel temperature is above a variably set level based on dissolved oxygen content of the fuel.

In some aspects, the system further comprises a third heat exchanger comprising a fifth section in fluid communication with the fuel, and a sixth section in thermal communication with the fifth section and in fluid communication with generator oil, wherein the fifth section is in fluid communication with and upstream of the third heat exchanger section.

In some aspects, the system also includes a first temperature sensor in thermal communication with the engine oil upstream of the second heat exchanger and a second temperature sensor in thermal communication with the engine oil downstream of the second heat exchanger, wherein the electronic controller determines temperature of the engine oil at the second heat exchanger based on output from the first and second temperature sensors.

In some aspects, the system also includes a third temperature sensor in thermal communication with the fuel upstream of the second heat exchanger and a second temperature sensor in thermal communication with the fuel downstream of the second heat exchanger, wherein the electronic controller determines temperature of the fuel at the second heat exchanger based on output from the third and fourth temperature sensors.

In some aspects of the invention, the controller is configured to set the positions of the oil bypass and control valves to maximize transfer of heat from the engine oil to the fuel in the second heat exchanger, with the proviso that fuel temperature at the second heat exchanger is maintained below a variably set level based on dissolved oxygen content in the fuel.

In some aspects of the invention, the system also includes a fuel stabilization unit in fluid communication with the fuel upstream of the heat exchangers, for removing dissolved oxygen from the fuel. In some aspects, the system also includes a fuel bypass valve configured to selectively distribute a flow of fuel between a first fuel flow path leading to the second heat exchanger without passing through the fuel stabilization unit and a second fuel flow path leading to the second heat exchanger through the fuel stabilization unit. In some aspects, the electronic controller is also configured to control a position of the fuel bypass valve to achieve a target content of dissolved fuel oxygen in the fuel. In some aspects, the target dissolved fuel oxygen content is determined based on a target fuel temperature desired at the second heat exchanger.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A fuel and thermal management system for delivery of fuel to an engine, comprising:
   a fuel supply line in fluid communication between a fuel tank and a fuel inlet of the engine;
   an oxygen sensor in fluid communication with the fuel supply line for measuring dissolved oxygen content in the fuel;
   a first heat exchanger comprising a first section in fluid communication with engine oil and a second section in thermal communication with the first section and in fluid communication with ambient air;
   a second heat exchanger comprising a third section in fluid communication with the fuel line, and a fourth section in thermal communication with the third section and in fluid communication with engine oil, wherein the fourth section is in fluid communication with and downstream of the first heat exchanger section;
   an engine oil bypass conduit in fluid communication with the engine oil upstream of the first heat exchanger and with the engine oil downstream of the first heat exchanger and upstream of the second heat exchanger;
   an oil bypass valve in fluid communication with the engine oil upstream of the first heat exchanger, the oil bypass valve configured to selectively distribute a flow of engine oil between the first heat exchanger section and the engine oil bypass conduit;
   a control valve in fluid communication with the second section of the first heat exchanger, configured to control a flow of ambient air through the second section of the first heat exchanger; and an electronic controller configured to set a position of the oil bypass valve or a position of the control valve or both the position of the oil bypass valve and the position of the control valve during operation of the system in response to: (i) dissolved oxygen content of the fuel and (ii) temperature of the engine oil or the temperature of the fuel at the second heat exchanger or both the temperature of the engine oil and the temperature of the fuel at the second heat exchanger.

2. The system of claim 1, wherein the electronic controller is configured to set a position of the oil bypass valve or a position of the control valve or both the position of the oil bypass valve and the position of the control valve during operation of the system further in response to: (iii) stored information on the formation of fuel deposits as a function of fuel temperature and dissolved oxygen content of the fuel.

3. The system of claim 1, wherein the electronic controller is configured to set the oil bypass valve to increase engine oil flow through the first heat exchanger or to set the control valve to increase air flow through the first heat exchanger or to both set the oil bypass valve to increase engine oil flow through the first heat exchanger and to set the control valve to increase air flow through the first heat exchanger, the oil bypass and/or control valves set in response to a determination that engine oil temperature or fuel temperature is above a variably set level based on dissolved oxygen content of the fuel.

4. The system of claim 1, further comprising a third heat exchanger comprising a fifth section in fluid communication with the fuel, and a sixth section in thermal communication with the fifth section and in fluid communication with generator oil, wherein the fifth section is in fluid communication with and upstream of the third heat exchanger section.

5. The system of claim 1, further comprising a first temperature sensor in thermal communication with the engine oil upstream of the second heat exchanger and a second temperature sensor in thermal communication with the engine oil downstream of the second heat exchanger, wherein the electronic controller determines temperature of the engine oil at the second heat exchanger based on output from the first and second temperature sensors.

6. The system of claim 5, further comprising a third temperature sensor in thermal communication with the fuel upstream of the second heat exchanger and a second temperature sensor in thermal communication with the fuel downstream of the second heat exchanger, wherein the electronic controller determines temperature of the fuel at the second heat exchanger based on output from the third and fourth temperature sensors.

7. The system of claim 1, wherein the controller is configured to set the positions of the oil bypass and control valves to maximize transfer of heat from the engine oil to the fuel in the second heat exchanger, with the proviso that fuel temperature at the second heat exchanger is maintained below a level that is set based on dissolved oxygen content in the fuel.

8. The system of claim 1, further comprising a fuel stabilization unit in fluid communication with the fuel upstream of the heat exchangers, for removing dissolved oxygen from the fuel.

9. The system of claim 8, further comprising a fuel bypass valve configured to selectively distribute a flow of fuel between a first fuel flow path leading to the second heat exchanger without passing through the fuel stabilization unit and a second fuel flow path leading to the second heat exchanger through the fuel stabilization unit.

10. The system of claim 9, wherein the electronic controller is configured to control a position of the fuel bypass valve to achieve a target content of dissolved fuel oxygen in the fuel.

11. The system of claim 10, wherein the target dissolved fuel oxygen content is determined based on a target fuel temperature at the second heat exchanger.

12. A method of thermally managing and delivering fuel to an engine, comprising:
    measuring the concentration of dissolved oxygen in the fuel;
    heating the fuel in a second heat exchanger with heat from oil circulated from the engine; and
    controllably directing, based on (i) dissolved oxygen content of the fuel and (ii) temperature of the engine oil or the fuel at the second heat exchanger or both the temperature of the engine oil and the temperature of the fuel at the second heat exchanger, a quantity of the circulated oil through a first heat exchanger to cool circulated oil.

13. The method of claim 12, further comprising controlling a quantity of the circulated oil through a bypass around the first heat exchanger or controlling a quantity of cooling air delivered to the first heat exchanger or both a quantity of the circulated oil through a bypass around the first heat exchanger and a quantity of cooling air delivered to the first heat exchanger.

14. The method of claim 12, further comprising heating the fuel in a third heat exchanger with oil circulated from a generator.

15. The method of claim 12, further comprising directing fuel through a fuel stabilization unit in fluid communication with the fuel upstream of the heat exchangers for removing dissolved oxygen from the fuel, and selectively distributing a flow of fuel between a first fuel flow path leading to the second heat exchanger without passing through the fuel stabilization unit and a second fuel flow path leading to the second heat exchanger through the fuel stabilization unit.

* * * * *